C. L. TAYNTOR.
PRODUCTION OF ACIDS.
APPLICATION FILED NOV. 29, 1919.
1,361,416.
Patented Dec. 7, 1920.
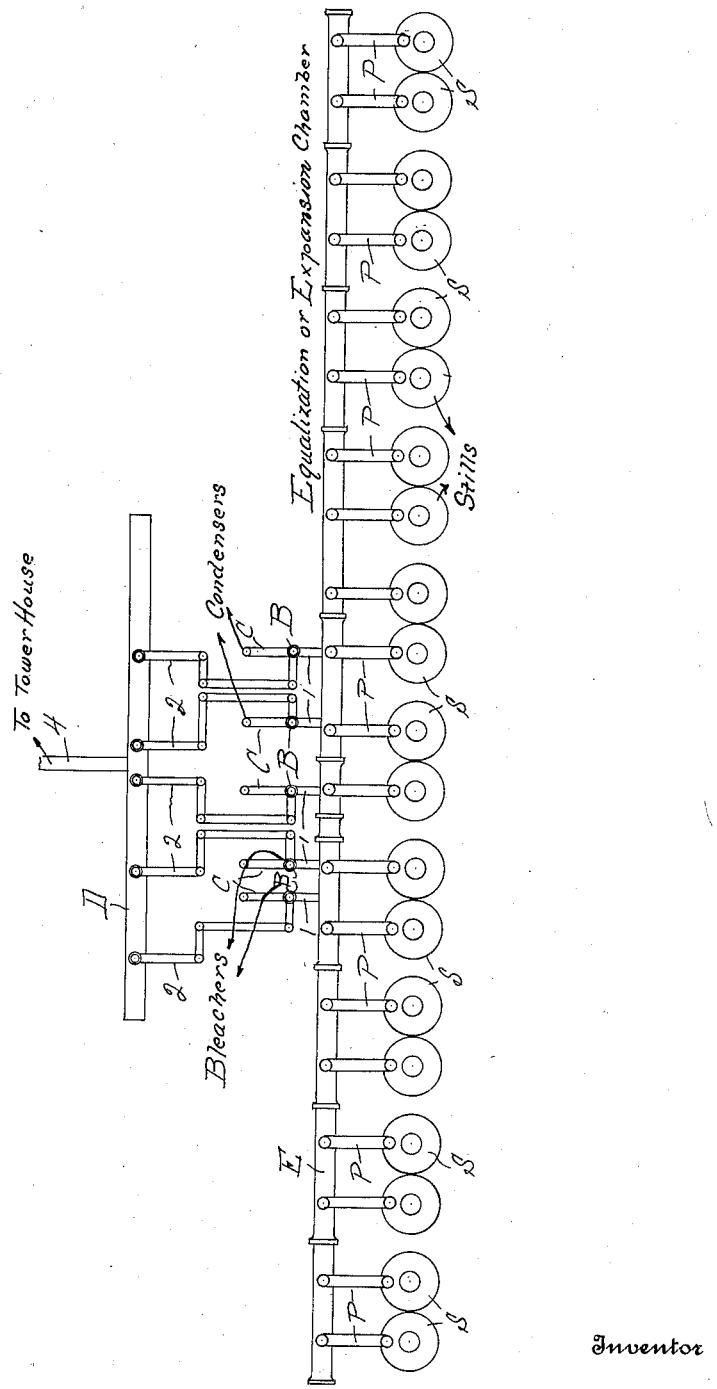

UNITED STATES PATENT OFFICE.

CHARLES L. TAYNTOR, OF CLAYMONT, DELAWARE.

PRODUCTION OF ACIDS.

1,361,416. Specification of Letters Patent. Patented Dec. 7, 1920.

Application filed November 29, 1919. Serial No. 341,347.

*To all whom it may concern:*

Be it known that I, CHARLES L. TAYNTOR, a citizen of the United States, residing at Claymont, in the county of New Castle and State of Delaware, have invented certain new and useful Improvements in the Production of Acids, of which the following is a specification, reference being had to the accompanying drawings.

This invention relates to certain improvements in the production of acids, and more particularly to the manufacture of nitric acid and incidentally to the manufacture of hydrochloric acid, and it is an object of the invention to provide a system or apparatus including an expansion chamber for the gases generated within a still or receptacle, and thereby resulting in a material saving of the product or gases.

Another object of the invention is to provide a novel and improved system for the production of gases wherein the gases generated within a still or receptacle or introduced into an expansion chamber where the pressures are equalized or dissipated, and wherein a system is provided which materially reduces the number of condensers and automatic bleachers from what is required in the systems now generally employed. When sulfuric acid and sodium nitrate are mixed in a still or receptacle there occurs a violent chemical reaction, which results in a high pressure, and in the systems now generally employed this pressure often results in the loss of a large part of the gases due to portions of the system or apparatus being blown apart, and particularly blowing out the putty at the joints of the bleachers and condensers.

A further object of the present invention is to provide a novel and improved system whereby these disadvantages are overcome.

Another object of the invention is to provide a novel and improved system for the generation of the gases, wherein an effective bleaching is obtained by the provision of a continuous passage of different strength gases through the bleachers, which assures the removal of the lower oxids.

The novel features of my invention will hereinafter be definitely claimed.

In order that my invention may be the better understood I will now proceed to describe the same with reference to the accompanying drawings, wherein is diagrammatically illustrated a system or means for producing acids arranged in accordance with an embodiment of my invention.

As disclosed in the accompanying drawings, S denotes a plurality of stills or receptacles, preferably twenty in number, and each of said stills or receptacles S has leading therefrom an 8" pipe P delivering within the equalization chamber E. The chamber E is common to all of the stills or receptacles S, and is made of 14" chemical ware or Duriron pipe. The gases generated within the stills or receptacles S upon the mixture of sodium nitrate and sulfuric acid are led through pipes P to the expansion chamber E. Any pressure formed in the various stills or receptacles S is equalized or dissipated within the expansion chamber E. The gases are also automatically mixed within the expansion chamber E, the rich gases mixing with the poor, and thereby resulting in a more even flow of the gas through the bleachers B.

The bleachers B in the present embodiment of my invention, are five in number, and the gases are led from the expansion chamber E to said bleachers B through the pipes 1. The bleachers B are each of the well known type, whereby the acid returning downward is bleached by the hot gases flowing upward to the condensers C.

The gases which are not condensed in the condensers C are conveyed through the pipes 2 to the 14" chemical ware pipe or Duriron pipe D, and from said pipe D, as indicated at 4, to the tower house, where said gases are absorbed by the water flowing through the towers, (as is well known).

In view of the foregoing it will at once be perceived that my improved system embodies means to effectively equalize or dissipate pressure which may be generated within the stills or receptacles S, so that the blowing out or the blowing apart of any portion of the apparatus comprised in the system is eliminated, resulting in the saving of the gases which would otherwise be lost, and whereby an increased yield of gases is obtained from a mixture of given quantities of sodium nitrate and sulfuric acid.

My improved system also assures a continuous flow of the gases through the bleachers, whereby the desired separation of the lower oxids is facilitated. The provision of the expansion chamber E also permits, in a twenty-still acid house, the use of a materially less number of condensers and bleachers, with the same efficiency and result obtained in the systems now generally employed.

I claim:

1. A system for generating nitric acid, from a mixture of sodium nitrate and sulfuric acid, consisting of a plurality of generating stills, an expansion chamber in communication with and common to all of said stills and pipes and bleachers to which the expansion chamber delivers.

2. A system for generating nitric acid, from a mixture of sodium nitrate and sulfuric acid, consisting of a plurality of generating stills, an expansion chamber in communication with and common to all of said stills and pipes and bleachers to which the expansion chamber delivers, condensers to which the bleachers deliver, and a chamber common to all of the condensers to receive uncondensed gas and adapted to deliver to a tower house.

3. A system for producing gases from a mixture of sodium nitrate and sulfuric acid embodying a twenty still acid house, an expansion chamber common to all of the stills, and five bleachers to which the expansion chamber delivers.

In testimony whereof I hereunto affix my signature.

CHARLES L. TAYNTOR.